Oct. 30, 1962  E. F. REIHMAN  3,061,693
MOTOR-DRIVEN MASTER SWITCH
Filed July 30, 1958
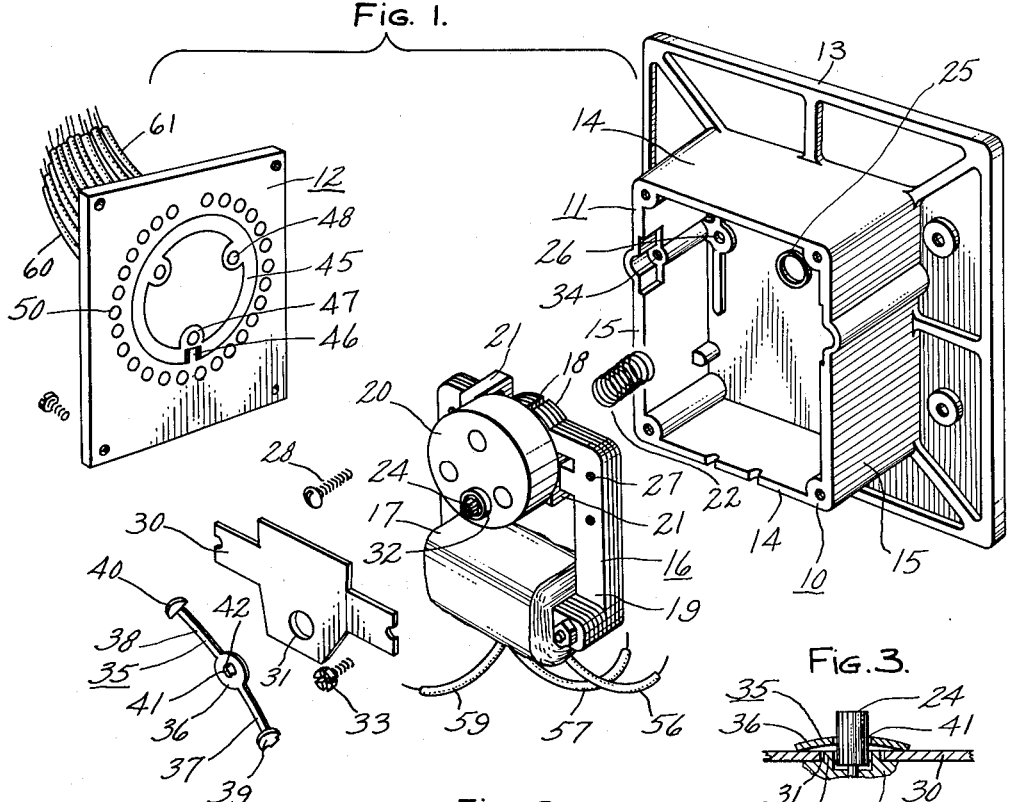

United States Patent Office 3,061,693
Patented Oct. 30, 1962

3,061,693
MOTOR-DRIVEN MASTER SWITCH
Earl F. Reihman, Warwick, R.I., assignor to General
Electric Company, a corporation of New York
Filed July 30, 1958, Ser. No. 751,961
2 Claims. (Cl. 200—37)

The present invention relates to an electrical switch and particularly a motor-driven master switch for energizing in rapid succession a plurality of individual circuits for each complete revolution of the output shaft of the geared motor that carries the bridging contact of the switch.

This invention has been conceived for a low voltage remote control wiring system for homes, farms, and industrial and commercial buildings in which the switching of the 125 and 250 volt circuits is accomplished by means of a low-voltage relay which can be installed directly in the outlet box of the circuit controlled or ganged in special gang boxes. These relays are actuated by a 24 volt circuit supplied by means of a transformer, and controlled by low voltage switches which are single pole, double throw, momentary contact, normally open type switches. Since these switches are of the momentary contact type, any number can be placed in parallel for multipoint control, thus limiting the need for special switches such as three-way and four-way switches as required in the ordinary wiring system. Motor-driven master switches permit the control of a plurality of circuits in a predetermined pattern of control, and the master switch may be operated in turn from any number of individual master control switches. The motor-driven master switch is connected with each of the relays, and the master switch makes one complete revolution each time a master control switch is operated.

The principal object of this invention is to provide a motor-driven master switch of simplified design with a novel motor contact ring for stopping the motor after one complete revolution.

A further object of this invention is to provide a motor-driven master switch with a novel arrangement of switch contacts so that the conduction of electricity through the switch will not interfere with the lubrication of the motor and vice versa.

A further object of this invention is to provide a motor-driven master switch with a novel mounting of the motor in the switch housing where the bridging contact of the switch cooperates with the mounting means for completion of the circuitry through the switch.

The present invention is embodied in a simplified design of a motor-driven master switch where the motor is a shaded-pole induction motor that includes a self-contained gear box for substantially reducing the speed of rotation of the output shaft of the motor. Such motors are commonly used for electric clocks, although it should be appreciated that this invention is not limited to a use of such a motor. The motor drives a bridging contact of the switch which in turn is in wiping engagement with the motor contact ring and a concentric group of individual circuit contacts. The motor contact ring is split so that the motor will stop after each complete revolution of the bridging contact. The motor is first started by a momentary starting switch which turns to move the bridging contact onto the split ring. Then the motor is self-energized and continues to run until the bridging contact returns to the split in the ring. The individual circuit contacts of the master switch are connected to either the On or Off coils of the relays. Accordingly, when the starting switch or master control switch is closed, the master switch will operate through one complete cycle and will operate all of the connected relays to the On position or to the Off position as the case may be. If both the On and Off coils of the relays are to be controlled, two master switches of this invention would be required.

My invention will be better understood from the following description taken in connection with the accompanying drawing and its scope will be pointed out in the appended claims.

FIGURE 1 is an exploded view of a motor-driven master switch embodying this invention.

FIGURE 2 is a wiring diagram showing the individual control circuits for a plurality of low voltage relays of a remote control wiring system; and in addition, a master switch embodying this invention for controlling the Off function of the same relays.

FIGURE 3 is a partial cross-sectional view through the output shaft of the motor showing the arched nature of the annular portion of the bridging contact.

Referring in detail to the drawing and in particular to FIGURE 1, 10 represents a switch housing formed by a recessed base 11 and a cover plate 12, both molded of suitable insulating material. The base 11 comprises a decorative faceplate 13, seen from the rear in FIGURE 1, and a boxlike construction on the back of the faceplate formed by top and bottom walls 14 and side walls 15. The base is only open toward the rear, and it is adapted to receive the shaded-pole motor 16 which is to be fastened therein. The housing is completed by assembling the cover plate 12 over the opening of the base to seal the switch mechanism within the housing.

The motor 16 is a standard gear motor similar to those used for inexpensive electric clocks. This type of motor is a single phase, self-starting motor comprising the motor winding 17 assembled around a laminated stator 19 that has four angularly arranged poles 18 that support a combined rotor housing and gear box 20. Two of the poles that are opposite each other support a copper strap called a shading coil 21 which shorts out a section of the pole face and has the effect of moving the magnetic field back and forth across the face. The moving magnetic field has the same effect as the rotating field and the motor is able to start up by itself. The rotor or armature of the motor is positioned between the four pole faces of the stator and it drives a series of speed reducing gears in the gear box 20. The output shaft of the motor is represented by the small pinion gear 24. The motor 16 is positioned within the base 10 with the end of the housing that surrounds the rotor bearing against a coil spring 22 that nests within the circular flange 25 on the back surface of the faceplate 13. Suitable openings 26 in the base and 27 in the stator of the motor will be in alignment to receive a fastening screw 28.

A motor mounting strap 30 is assembled over the gear box of the motor and cooperates with the spring 22 to hold the motor within the base or, alternatively, as a substitute for the fastening means 28. The metal strap 30 has a circular opening 31 which fits over a collar 32 that is formed as part of the gear box and encircles a portion of the pinion 24. The strap 30 is suspended between the side walls 15 of the base and held in place by the screw fasteners 33 that are threaded into the holes 34 in the side walls.

A spring contact member 35 serves as a bridging contact for the switch and is mounted for driving engagement on the pinion 24 of the motor. The bridging contact 35 has an annular portion 36 that supports a short arm 37 and an opposite long arm 38. The two arms 37 and 38 are formed out of the plane of the annular portion 36 and away from the motor 16 so that the two arms constitute a bowed spring for reasons which will be explained hereinafter. The free ends of the arms 37 and 38 are enlarged and folded perpendicularly as at 39 and 40 respectively and have a semi-circular shape for edgewise engagement with the fixed contacts of the switch. The annular portion 36 of the bridging contact has a circular opening 41 with two diametrically opposed inward projections 42 which mesh within the gear teeth of the pinion so that the bridging contact will be driven by the motor. As best seen in FIGURE 3, the two sides of the annular portion 36 which are farthest from the connection with the arms 37 and 38, are bent down slightly to provide a double line contact between the opposite sides of the annular portion and the underlying metal mounting strap 30 for a good electrical connection through the bridging contact and the mounting strap.

The cover plate 12 of the switch housing contains a split ring 45 that has a notch or insulating slot 46. In reality, this ring 45 is a continuous ring, but the slot 46 changes the characteristics of the ring to that of a split ring for purposes of this invention. This ring 45 has been made continuous by connecting it together around the slot 46 as at 47 so that the ring will be easier to handle and fasten to the cover. Three radially spaced rivets 48 hold the ring 45 to the cover. One of these rivets 48 is provided with a short lead wire 60 so that the ring may be electrically connected to one side of the secondary of a step-down transformer 49 in FIGURE 2. Concentrically arranged around the split ring 45 is a series of radially spaced fixed contacts 50. Both the split ring 45 and the circular arrangement of fixed contacts 50 are concentrically arranged around the longitudinal pivotal axis of the output shaft and pinion 24 of the motor. Accordingly, the free end 39 of the short arm 37 of the bridging contact will engage the split ring 45 while the opposite end 40 of the long arm 38 of the bridging contact is adapted to engage the fixed contacts 50. Each of the fixed contacts 50 are provided with short lead wires 61 that are connected to a separate relay of the system.

Turning now to a consideration of the wiring diagram of FIGURE 2, the master switch 10 is shown connected to a source of power at the secondary of the step-down transformer 49 at a voltage of 24 volts. Also, the master switch is wired by leads 61 for controlling the Off coils of the relays 52 that are arranged within the block labeled "regular remote control wiring." These relays 52 are connected to the transformer 49 by leads 53 and 54. Each relay 52 may have one or more control switches 55 for operating the relay and switching the high voltage power circuits (not shown) that branch out from the service entrance box within the building. Each switch 55 is a single pole, double throw, momentary contact switch which is normally open. When the switch is moved in one direction, it will energize the Off coil of the relay to open the power circuit that is controlled by the relay. If the switch 55 were pressed in the opposite direction, the On coil of the relay would be energized to close the power circuit, as will be well understood by those working in this art.

The winding coil 17 of the motor is connected by means of leads 56 and 57 to the secondary of the transformer 49. A momentary contact motor starting switch 58 is interposed in the connection 57 for energizing the motor. A third lead wire 59 extends from the motor coil 17 and is soldered to the mounting strap. Finally, the split ring 45 is electrically connected to the secondary of the transformer by means of the lead 60. This lead 60 shunts the motor starting switch 58 in cooperation with the split ring 45, bridging contact 35, mounting strap 30 and lead 59. The bridging contact 35 is designed to stop when the end 39 of the short arm 37 sweeps through one complete revolution and arrives at the slot 46, thereby breaking the motor circuit. There is also a wider spacing between the two fixed contacts 50 at the top of the circle directly opposite the slot 46. Hence, when the movement of the bridging contact is arrested, the long arm 38 of the bridging contact will be out of engagement with the fixed contacts 50. There is no overtravel of the bridging contact because a very small mass is involved, which makes it possible to utilize a narrow slot 46 in the split ring. A pilot light 62 is connected directly across the motor winding 17 so that the person operating the master control switch 58 will have some indication that the switch is operating. The pilot light will be energized when the motor starts and will go out when the motor stops.

Having described above my invention of a novel motor-driven master switch of simplified design, it will be readily apparent to those skilled in this art that the relays 52 may either be controlled individually by means of the momentary contact switches 55 or, alternatively, they may be actuated in unison by a single cycle of operation of the master switch 10 by pressing the master control switch 58. The bridging contact 35 will always stop when it rides off of the split ring 45 and into the slot 46. To operate the master switch, it is necessary to close the starting switch 58, thereby energizing the motor 16 which swings the bridging contact 35 out of the slot and into wiping engagement with the split ring 45. Once the bridging contact engages the split ring 45, the motor is directly connected to the secondary of the transformer and is self-energized until the bridging contact makes a complete revolution and breaks the circuit when it returns to the slot 46 of the split ring 45. In making this complete revolution, the long arm 38 of the bridging contact is sweeping the fixed contacts 50, thereby momentarily energizing each of the Off coils of the relays 52. It will be understood that if it were desired to control both the On and Off coils of the relays, it would be necessary to have two master switches 10 of the present invention. One important feature of this invention is that the connection from the bridging contact 35 to the motor winding 17 is not made through the housing of the gear box 20 but, instead, the current is carried through the metal mounting strap 30 and lead 59. If the circuit were through the gear housing, the flow of current might jeopardize the permanent lubrication of the motor bearings and vice versa. An alternative would be to add an additional slip ring in place of the mounting strap 30 for engagement by a spring portion of the bridging contact 35.

Modifications of this invention will occur to those skilled in this art and it is to be understood, therefore, that this invention is not limited to the particular embodiments disclosed but that it is intended to cover all modifications that are within the true spirit and scope of this invention.

What I claim as new and desire to secure by Letters Patent of the United States is:

1. A motor driven master switch comprising a gear motor, a rotatable contact wiper arm mounted on the shaft of said motor, a contact ring coaxial with the shaft of said motor in engagement with said contact wiper arm, said contact ring having a short segment which breaks electrical contact through said wiper arm, and a plurality of circularly positioned contacts sequentially wiped by said wiper arm as said arm rotates.

2. A motor driven master switch as claimed in claim 1 wherein the contact wiper arm has two oppositely disposed blades of unequal length, one of which engages the contact ring and the other of which wipes the circularly positioned contacts.

References Cited in the file of this patent

UNITED STATES PATENTS

| | | |
|---|---|---|
| 1,092,736 | Meier | Apr. 7, 1914 |
| 2,100,284 | Kriechbaum | Nov. 23, 1937 |
| 2,116,314 | Jenkins | May 3, 1938 |
| 2,542,947 | Rowe | Feb. 20, 1951 |
| 2,799,811 | Lindars | July 16, 1957 |
| 2,888,625 | Farrell et al. | May 26, 1959 |
| 2,902,554 | Seele | Sept. 1, 1959 |
| 2,928,406 | Cunniff et al. | Mar. 15, 1960 |